US012547829B2

(12) United States Patent
Farre Guiu et al.

(10) Patent No.: US 12,547,829 B2
(45) Date of Patent: Feb. 10, 2026

(54) EXTENDED VOCABULARY INCLUDING SIMILARITY-WEIGHTED VECTOR REPRESENTATIONS

(71) Applicant: Disney Enterprises, Inc., Burbank, CA (US)

(72) Inventors: Miquel Angel Farre Guiu, Bern (CH); Marc Junyent Martin, Barcelona (ES); Marcel Porta Valles, Balaguer (ES); Pablo Pernias, Sant Joan d'Alacant (ES); Francesc Josep Guitart Bravo, Lleida (ES); Christopher C. Stoafer, Seattle, WA (US); Mara Idai Lucien, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 292 days.

(21) Appl. No.: 17/581,515

(22) Filed: Jan. 21, 2022

(65) Prior Publication Data

US 2023/0237261 A1 Jul. 27, 2023

(51) Int. Cl.
*G06F 40/279* (2020.01)
*G06F 16/334* (2025.01)
*G06F 40/169* (2020.01)
*G06N 20/00* (2019.01)

(52) U.S. Cl.
CPC ........ *G06F 40/279* (2020.01); *G06F 16/3344* (2019.01); *G06F 40/169* (2020.01); *G06N 20/00* (2019.01)

(58) Field of Classification Search
CPC .. G06F 40/279; G06F 16/3344; G06F 40/169; G06N 20/00
See application file for complete search history.

(56) References Cited

U.S. PATENT DOCUMENTS

| | | |
|---|---|---|
| 6,356,864 B1 * | 3/2002 | Foltz .............. G06F 40/30 704/9 |
| 8,606,815 B2 | 12/2013 | Chen et al. |
| 9,916,381 B2 | 3/2018 | Antonelli et al. |
| 10,019,442 B2 | 7/2018 | Nefedov et al. |
| 11,113,308 B1 | 9/2021 | Singh et al. |
| 2009/0327336 A1 | 12/2009 | King et al. |

(Continued)

*Primary Examiner* — Richemond Dorvil
*Assistant Examiner* — Ethan Daniel Kim
(74) *Attorney, Agent, or Firm* — Farjami & Farjami LLP

(57) ABSTRACT

According to one implementation, a system includes a computing platform having processing hardware, and a system memory storing a software code. The processing hardware is configured to execute the software code to receive a vocabulary, identify words from the vocabulary for use in extending the vocabulary, pair each of those words with every other of those words to provide word pairs, and output the word pairs to a vocabulary administrator. The software code also receives word pair characterizations identifying each of the word pairs as one of similar, dissimilar, or neither similar nor dissimilar, configures, based on the word pair characterizations, a multi-dimensional vector space including multiple embedding vectors each corresponding respectively to one of the identified words, and cross-references each of those words with its corresponding embedding vector to produce an extended vocabulary corresponding to the received vocabulary.

20 Claims, 5 Drawing Sheets

(56) References Cited

U.S. PATENT DOCUMENTS

| | | | |
|---|---|---|---|
| 2011/0251839 A1* | 10/2011 | Achtermann | G06F 40/211 |
| | | | 704/10 |
| 2015/0220618 A1 | 8/2015 | Horesh et al. | |
| 2017/0330363 A1* | 11/2017 | Song | G06T 9/00 |
| 2019/0005049 A1* | 1/2019 | Mittal | G06F 16/3347 |
| 2019/0303465 A1* | 10/2019 | Shanmugamani | G06F 16/2237 |
| 2021/0004534 A1* | 1/2021 | Mizushima | G06F 40/237 |
| 2021/0074171 A1* | 3/2021 | Agley | G11B 27/19 |
| 2021/0110432 A1* | 4/2021 | Chen | G06F 16/2237 |
| 2021/0150346 A1 | 5/2021 | Bertinetto et al. | |

\* cited by examiner

EXTENDED VOCABULARY INCLUDING SIMILARITY-WEIGHTED VECTOR REPRESENTATIONS

BACKGROUND

The annotation, or "tagging," of digital media content may be performed manually by human taggers, or in an automated or substantially automated process, based on a predetermined taxonomy including a vocabulary of words that may be applied as annotation tags. Each word included in the taxonomy is purposefully selected for use as a tag and has a carefully defined scope and intended application that is well understood by the librarians or administrators of the taxonomy. Nevertheless, given the subjective nature of manual tagging, and the ambiguity associated with some of the features of content to which tags are to be applied, both human and automated taggers may reinterpret tags and apply them in a manner that is inconsistent with their intended use.

Due to its popularity, ever more digital media content is being produced and made available to consumers. As a result, the efficiency and accuracy with which digital media content can be tagged and managed has become increasingly important to the producers, owners, and distributors of that content. For example, tagging of video is an important part of the production, distribution, and recommendation processes for television (TV) content and movies. Consequently, there is a need in the art for systems and methods enabling the consistently accurate application of the tags included in annotation taxonomies by automated and human taggers alike.

DETAILED DESCRIPTION

Figure 1:
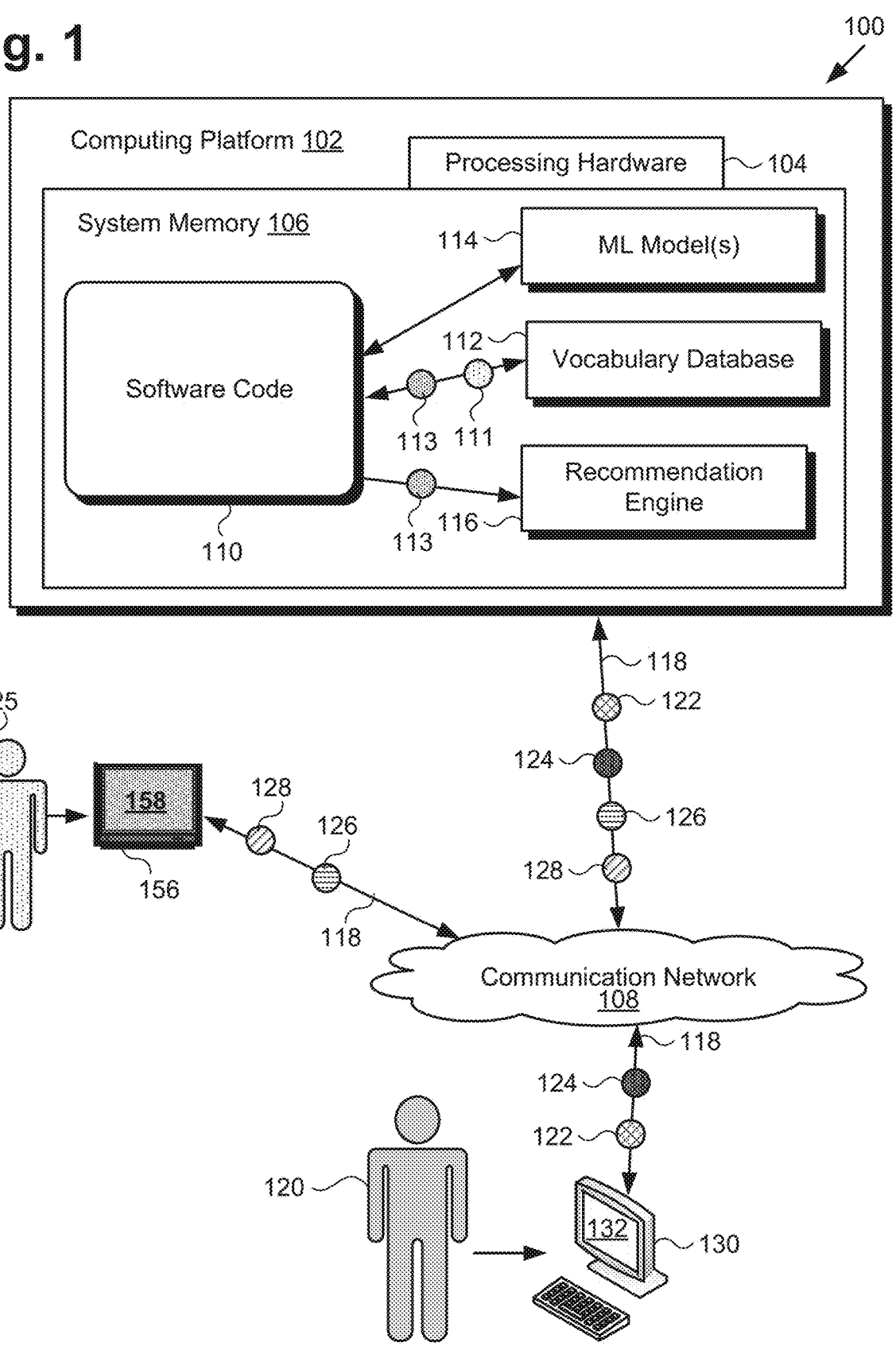
FIG. 1 shows a diagram of an exemplary system for providing an extended vocabulary including similarity-weighted vector representations of its words, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As noted above, the annotation, or "tagging," of digital media content may be performed manually by human taggers, or in an automated or substantially automated process, based on a predetermined taxonomy including a vocabulary of words that may be applied as annotation tags (annotation tags hereinafter also referred to simply as "tags"). Each word included in the taxonomy is purposefully selected for use as a tag and has a carefully defined scope and intended application that is well understood by the administrators of the taxonomy. Nevertheless, given the subjective nature of manual tagging, and the ambiguity associated with some of the features of content to which tags are to be applied, both human and automated taggers may reinterpret tags and apply them in a manner that is inconsistent with their intended use, or may wrongly treat all words used in tagging as independent by using "one hot encoding" approaches, as known in the art.

By way of example, genre tags for audio-video (AV) content may include the tags "buddy," "comedy," and "survival," to name a few. An interpretive comparison of those genre tags reveals that the tags "buddy" and "comedy" are more similar than the tags "comedy" and "survival," which are in fact two very different or dissimilar tags. However, such an interpretive comparison of the similarity of the tags "buddy," "comedy," and "survival" cannot be performed using existing methods that implement one hot encoding approaches that treat each genre pair as equally similar. Although other existing approaches based on word co-occurrence statistics can be used to determine weighted distances between tags, those existing approaches fail to capture the intended meaning of the tags, thereby failing to exploit the expertise used to develop the annotation taxonomy that includes the tags.

The present application discloses systems and methods for providing an extended vocabulary including similarity-weighted vector representations of its words. It is noted that although the present solution is described below in detail by reference to the exemplary use case of AV content annotation, the present novel and inventive principles may more generally find other applications to increasing consistency and accuracy for a variety of classification processes.

It is further noted that, as defined in the present application, the term "taxonomy" refers to a classification scheme including a vocabulary of words and relationships amongst those words, while the term "vocabulary" refers to any collection of words and may be unstructured. That is to say, a vocabulary does not need to have any explicit relationship or hierarchy between the words, while a taxonomy is by definition structured and includes those relationships or that hierarchy. Thus, a vocabulary may be included in a taxonomy. For example, in some implementations, a vocabulary may take the form of a predetermined set of words for use as metadata tags, and may be included in a taxonomy having a hierarchical structure.

It is also noted that, as defined in the present application, the expression "extended vocabulary" refers to the same predetermined set of words included in a vocabulary, at least some of which are accompanied in the extended vocabulary by mathematical representations conveying the knowledge about and interpretation of those accompanied words by the librarians administering the vocabulary or the taxonomy including the vocabulary. In some implementations, the mathematical representations included in the extended vocabulary may take the form of embedding vectors corresponding respectively to the words they accompany.

With respect to the characterizations "similar," "dissimilar," and "neither similar nor dissimilar" used in the present application, it is noted that those characterizations are typically applied by reference to a specific taxonomy. For example, in the context of AV content genres, the words "kids" and "animation" may be characterized as similar, while in the context of subject matter, "kids" may be characterized as similar to "parenting" or "family" but dissimilar to "animation." In the context of characters, the word "kids" may be characterized as similar to "toddlers." In the three context specific characterizations described above, the embedding vectors for each of the three different contextualized versions of the word "kids" will be different, since the meaning of that word is different with respect to each context for the vocabulary administrator.

Furthermore, as defined in the present application, the expression "machine learning model" may refer to a mathematical model for making future predictions based on patterns learned from samples of data or "training data." Various learning algorithms can be used to map correlations between input data and output data. These correlations form the mathematical model that can be used to make future predictions on new input data. Such a predictive model may include one or more logistic regression models, Bayesian models, or neural networks (NNs).

A "deep neural network," in the context of deep learning, may refer to an NN that utilizes multiple hidden layers between input and output layers, which may allow for learning based on features not explicitly defined in raw data. As used in the present application, a feature identified as an NN refers to a deep neural network. In various implementations, NNs may be trained as classifiers and may be utilized to perform image processing or natural-language processing.

FIG. 1 shows a diagram of exemplary system 100 for providing an extended vocabulary including similarity-weighted vector representations of its words, according to one implementation. System 100 includes computing platform 102 having processing hardware 104, and system memory 106 implemented as a computer-readable non-transitory storage medium. As shown in FIG. 1, according to some implementations, system memory 106 stores software code 110, vocabulary database 112, one or more machine learning models 114 (hereinafter "ML model(s) 114"), and in some of those implementations, also stores recommendation engine 116.

As further shown in FIG. 1, system 100 may be implemented in a use environment including human vocabulary administrator 120 (hereinafter "vocabulary administrator 120") utilizing workstation 130 including display 132, and user system 156 utilized by user 125 (hereinafter also "end user 125"). In addition, FIG. 1 shows vocabulary 111, extended vocabulary 113, word pairs 122 output to workstation 130 utilized by vocabulary administrator 120, characterizations 124 of word pairs 120 (hereinafter "word pair characterizations 124") provided to system 100 by vocabulary administrator 120, content search data 126 received by system 100 from user system 156, and content recommendation 128 provided to user system 156 by system 100. Also shown in FIG. 1 are display 158 of user system 156, and communication network 108 providing network communication links 118 interactively coupling workstation 130 and user system 156 to system 100.

Although FIG. 1 depicts one vocabulary administrator 120 and one end user 125, that representation is merely provided in the interests of conceptual clarity. More generally, vocabulary administrator 120 may correspond to a single vocabulary administrator, or to multiple vocabulary administrators, while end user 125 may correspond to as few as one or more end users, such as hundreds, thousands, or millions of end users.

With respect to the representation of system 100 shown in FIG. 1, it is noted that although software code 110, vocabulary database 112, ML model(s) 114, and recommendation engine 116 are depicted as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to processing hardware of a computing platform, such as processing hardware 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

It is further noted that although FIG. 1 depicts software code 110, vocabulary database 112, ML model(s) 114, and recommendation engine 116 as being mutually co-located in system memory 106, that representation is also merely provided as an aid to conceptual clarity. More generally, system 100 may include one or more computing platforms, such as computer servers for example, which may be co-located, or may form an interactively linked but distributed system, such as a cloud-based system, for instance. As a result, processing hardware 104 and system memory 106 may correspond to distributed processor and memory resources within system 100. Thus, it is to be understood that software code 110, vocabulary database 112, modified annotation taxonomy 112b, and software code 110, vocabulary database 112, ML model(s) 114, and recommendation engine 116 may be stored remotely from one another within the distributed memory resources of system 100. It is also noted that, in some implementations, one or more of ML model(s) 114 and recommendation engine 116 may take the form of software modules included in software code 110.

Processing hardware 104 may include multiple hardware processing units, such as one or more central processing units, one or more graphics processing units, one or more tensor processing units, one or more field-programmable gate arrays (FPGAs), and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 110, from system memory 106, while a GPU may be implemented to reduce the processing overhead of the CPU by performing computationally intensive graphics or other processing tasks. A TPU is an application-specific integrated circuit (ASIC) configured specifically for artificial intelligence (AI) applications such as ML modeling.

In some implementations, computing platform 102 may correspond to one or more web servers, accessible over a packet-switched network such as the Internet, for example.

Alternatively, computing platform 102 may correspond to one or more computer servers supporting a private wide area network (WAN), local area network (LAN), or included in another type of limited distribution or private network. As yet another alternative, in some implementations, system 100 may be implemented virtually, such as in a data center. For example, in some implementations, system 100 may be implemented in software, or as virtual machines.

Although workstation 130 is shown as a desktop computer in FIG. 1, while user system 156 is shown as a smart television (smart TV) those representations are provided merely as examples as well. More generally, workstation 130 and user system 156 may be any suitable mobile or stationary computing devices or systems that implement data processing capabilities sufficient to provide a user interface, support connections to communication network 108, and implement the functionality ascribed to respective workstation 130 and user system 156 herein. For example, in other implementations, either or both of workstation 130 and user system 156 may take the form of laptop computers, tablet computers, or smartphones, for example, while in other implementations, user system may take the form of a game platform or smart wearable device, such as a smartwatch, for instance.

With respect to displays 132 and 158 of respective workstation 130 and user system 156, displays 132 and 158 may be physically integrated with respective workstation 130 and user system 156, or may be communicatively coupled to but physically separate from respective workstation 130 and user system 156. For example, where workstation 130 or user system 156 is implemented as a smartphone, laptop computer, or tablet computer, respective display 132 or 158 will typically be integrated with workstation 130 or user system 156. By contrast, where workstation 130 or user system 156 is implemented as a desktop computer, display 132 or 158 may take the form of a monitor separate from respective workstation 130 or user system 156 in the form of a computer tower. Furthermore, either or both of displays 132 and 158 of respective workstation 130 and user system 156 may be implemented as a liquid crystal display (LCD), a light-emitting diode (LED) display, an organic light-emitting diode (OLED) display, a quantum dot (QD) display, or any other suitable display screen that performs a physical transformation of signals to light.

By way of overview, the vocabulary extension solution disclosed by the present application represents the vocabulary knowledge held by vocabulary administrator 120 about similarities and dissimilarities among the words included in vocabulary 111 as mathematical representations, and delivers those mathematical representations to taggers and end user 125 as part of extended vocabulary 113 that also includes the specific words eligible for use as tags. As a result, it is possible for taggers and end user 125 to achieve semantically meaningful results using the mathematical representations, such as, for example, measuring distances between words having different degrees of similarity. In some implementations, the present approach represents each of some or all words in vocabulary 111 using a respective embedding vector in a multi-dimensional vector space (also "embedding space") and sends those embedding vectors to taggers and end user 125, or otherwise utilizes those embedding vectors, along with their corresponding words.

As noted above, because the characterizations "similar," "dissimilar," and "neither similar nor dissimilar" applied to words included in a vocabulary are specific to the context of a particular taxonomy, different contextualized versions of the same word may be represented by a different embedding vector, since the meaning of that word is different with respect to each context for the vocabulary administrator. Moreover, the present approach allows for the use case in which the multi-dimensional vector space that includes the embedding vectors is a shared embedding space in which different word embeddings of the same word for each of genres, subjects, and characters might have different embeddings in that shared space.

It is noted that the embedding vectors included in extended vocabulary 113 may be beneficially utilized by any individual, group, organization, or service that utilizes vocabulary 111. For example, those mathematical representations may be used by taggers to identify hidden similarities among ostensibly dissimilar items, as well as to discern dissimilarities between items that appear superficially to be similar. Thus, use of extended vocabulary 113 can enable taggers to more accurately annotate a corpus of items, such as media content, for example. In addition, extended vocabulary 113 may be used by a wide variety of recommendation systems to identify products, services, and digital media content. That is to say, in addition to use by a tagger or content recommendation engine, extended vocabulary 113 may be beneficially implemented in recommendations systems used by realtors, travel agents, and consumers of retail merchandise, to name a few examples.

Figure 2:
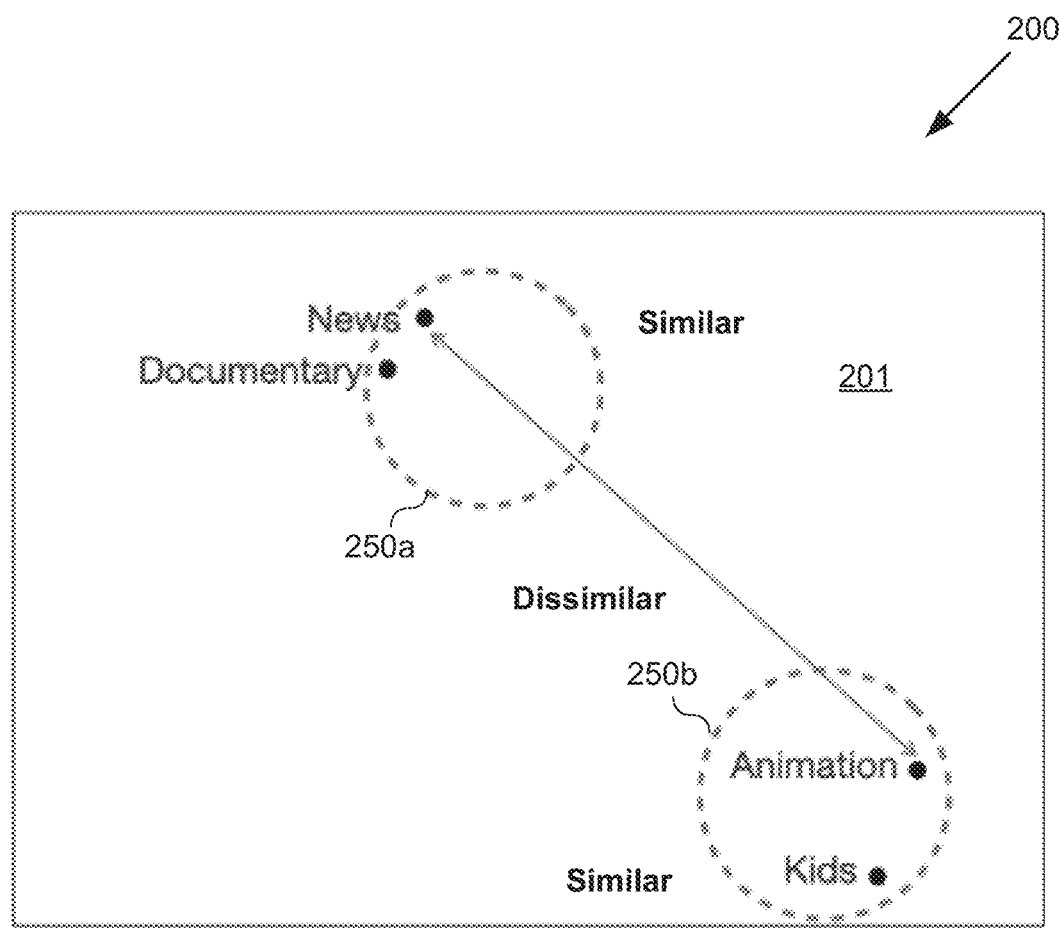
FIG. 2 shows an exemplary diagram depicting similarity-weighted distancing of words included in an extended vocabulary, according to one implementation.

FIG. 2 shows exemplary diagram 200 depicting similarity-weighted distancing of words included in an extended vocabulary, according to one implementation. The vector representations of words described above enables identification of words that are similar in meaning, in the context of a specific taxonomy, and therefore relatively close to one another in multi-dimensional vector space 201, as well as clusters of words that are similar to one another but dissimilar from other clusters and therefore relatively distant from those other clusters in multi-dimensional vector space 201.

It is noted that words may be characterized as "similar" to one another, "dissimilar" to one another, or "neither similar nor dissimilar" to one another. As used in the present application, those characterizations have the following definitions: Similar: Word meanings, in the context of a specific taxonomy, are overlapping or the words tend to appear together.

Example: animation—anime (context=genre)

Dissimilar: Word meanings, in the context of a specific taxonomy, are different, and words do not appear together, Example: animation—news (context=genre)

Neither Similar nor Dissimilar: Word meanings, in the context of a specific taxonomy, are different, but they could appear together.

Example: animation—comedy (context=genre)

It is further noted that multi-dimensional vector space 201 may be n-dimensional, where "n" is any desired integer value. Moreover, in some implementations, the embedding vectors corresponding respectively to the words included in vocabulary 111, in FIG. 1, may provide the basis vectors for multi-dimensional vector space 201. For example, in some implementations, embedding vectors corresponding respectively to words characterized as neither similar nor dissimilar to one another may be orthogonal to one another in multi-dimensional vector space 201. In those implementations, the set of orthogonal embedding vectors spanning multi-dimensional vector space 201 may serve as the basis vectors of multi-dimensional vector space 201.

As shown in FIG. 2, the words "news" and "documentary" have some overlap in meaning relative to the context "genre" and are often used together, and thus are included in similarity cluster 250a. Analogously, the words "kids" and "animation," while having different meanings, are often used together when the context is "genre," and thus are included in another similarity cluster 250b. However, the words included in similarity cluster 250a have different meanings from and are rarely or never used together with the words included in similarity cluster 250b when the context is "genre." Consequently, the words in similarity cluster 250a are dissimilar to those included in similarity cluster 250b, and those similarity clusters do not intersect nor abut one another in multi-dimensional vector space 201. It is noted that the determination that two words are rarely or never used together is a subjective one made by a vocabulary administrator whose knowledge is to be encoded in the embedding vectors, and can vary for the same words based on context, as discussed above.

Figure 3:
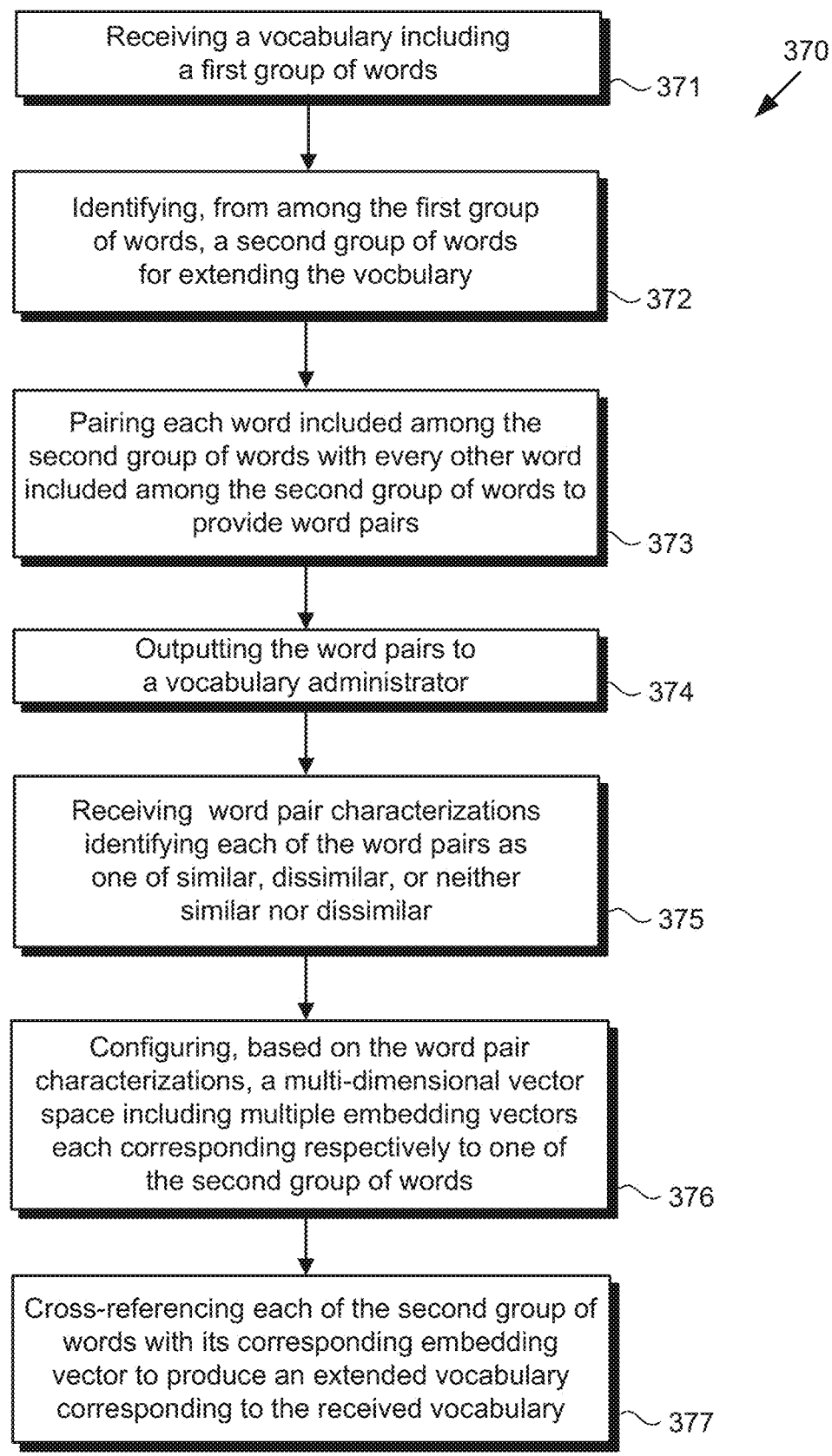
FIG. 3 shows a flowchart outlining an exemplary method for providing an extended vocabulary including similarity-weighted vector representations of its words, according to one implementation.

The functionality of system 100 will be further described by reference to FIG. 3. FIG. 3 shows flowchart 370 presenting an exemplary method for providing an extended vocabulary including similarity-weighted vector representations of its words, according to one implementation. With respect to the method outlined in FIG. 3, it is noted that certain details and features have been left out of flowchart 370 in order not to obscure the discussion of the inventive features in the present application.

Referring now to FIG. 3 in combination with FIG. 1, flowchart 370 begins with receiving vocabulary 111 including a first group of words (action 371). As noted above, in some implementations, the vocabulary 111 may be included as part of a taxonomy having a hierarchical structure. For example, vocabulary 110 may be a predetermined group of words for use as metadata tags applied to products, services, or content in the form of images, audio, video, or broadcast or streamed AV content in the form of one or more TV episodes, movies, animations, video games, audio tracks, music videos, or content artwork for example. In other words, the taxonomy that includes vocabulary 111 may be a taxonomy of annotation tags. Vocabulary 111 may be received in action 371 by software code 110, executed by processing hardware 104 of computing platform 102.

Flowchart 370 further includes identifying, from among the first group of words, a second group of words for extending vocabulary 111 (action 372). In some implementations, each of the first group of words (i.e., all of the first group of words) may be identified for use in extending vocabulary 111 in action 372, in which case the second group of words identified in action 372 may be identical to the first group of words included in vocabulary 111. However, as discussed below, in some use cases, representing the entire first group of words included in vocabulary 111 by respective mathematical representations at once may be impracticable, in which case the second group of words may be a subset of the first group of words. It is noted that in use cases in which the second group of words identified in action 372 is a subset of the first group of words included in vocabulary 111, action 372, as well as actions 373 through 377 described below, may be repeated until all or substantially all words in vocabulary 111 are cross-referenced with their respective mathematical representations in extended vocabulary 113. Identification of the second group of words each to be represented by a respective embedding vector, in action 372 may be performed by software code 110, executed by processing hardware 104 of computing platform 102, in the manner described below.

By way of foreshadowing, in order to represent each of the words included in vocabulary 111 by an embedding vector or other mathematical object, it may be advantageous or desirable to have the similarity or dissimilarity among those words, in the context of a specific taxonomy, evaluated and tagged by a vocabulary administrator as one of similar, dissimilar, or neither similar nor dissimilar (tagging of word pairs as similar, dissimilar, or neither similar nor dissimilar hereinafter referred to as "similarity-tagging"). With those tagging rules, it is possible, in principle, to similarity-tag all possible pairs of words in vocabulary 111. However, a problem with this approach is its lack of scalability because the number of manually applied similarity-tags grows exponentially relative to the number of words being similarity-tagged. In some implementations, this approach may be rendered more manageable by exploiting the hierarchical structure of the taxonomy that includes vocabulary 111.

For example, where vocabulary 111 is included in a taxonomy having a tree-shaped hierarchical structure, the second group of words identified in action 372 may be identified based on a ranking of the words included in vocabulary 111, where the words ranked highest are prioritized for similarity-tagging. For example, word pairs that share the same parent word may have their ranking lowered the farther down the tree those words are positioned. As another example, when parent words of different branches of the tree are known to be neither similar nor dissimilar to one another, the farther down the tree those parents are positioned, the lower the ranking of any word pair that includes children of those parents. Thus, where vocabulary 111 is included in a taxonomy having a hierarchical structure, the second group of words identified in action 372 may be identified based on respective positions of each word of the second group of words within the hierarchical structure.

It is noted that, in some implementations, it may be advantageous or desirable to assume transitivity in the relations amongst words of vocabulary 111, while minimizing the error as much as possible. For instance, if the taxonomy that includes vocabulary 111 includes four parent words A, B, C, D, where, A is similar to B and C, and B is similar to D, it may be assumed that A is similar to D. However, if C is dissimilar from D, that assumption is suspicious, and the relation between A and D needs to be determined. In this example, there is only one hop between the words, and the ranking decreases as the number of hops increases. Such a ranking enables prioritizing of similarity-tagging and makes it possible to cease similarity-tagging when the number of unexpected results between expected word pair relations and the word pair relations provided by a library administrator during similarity-tagging falls below a predetermined threshold. Thus, in use cases in which the second group of words identified in action 372 is a subset of the first group of words included in vocabulary 111, and action 372, as well as actions 373 through 377 described below are repeated until all or substantially all words in vocabulary 111 are cross-referenced with their respective mathematical representations in extended vocabulary 113, the ranking process described above may be performed iteratively for each subset of words.

Flowchart 370 further includes pairing each word included among the second group of words with every other word included among the second group of words to provide word pairs 122 (action 373). It is noted that, as defined for the purposes of the present application, a "pair" of words refers to not more than two words, which must be different. Thus, as the expression "pairing" is used herein, a word cannot be paired with itself or with more than one other word. Pairing, in action 373, of the words identified in action 372 may be performed by software code 110, executed by processing hardware 104 of computing platform 102.

Flowchart 370 further includes outputting the word pairs 122 to vocabulary administrator 120 (action 374). As discussed above, word pairs 122 drawn from the second group of words identified in action 372 may be provided to vocabulary administrator 120 for similarity-tagging. As shown in FIG. 1, word pairs 122 may be output to workstation 130 utilized by vocabulary administrator 120, via communication network 108 and network communication links 118. Action 374 may be performed by software code 110, executed by processing hardware 104 of computing platform 102.

Flowchart 370 further includes receiving, from vocabulary administrator, word pair characterizations 124 identifying each of word pairs 122 as one of similar, dissimilar, or neither similar nor dissimilar (action 375). As shown in FIG. 1, word pair characterizations 124 may be received by system 100 from workstation 130 utilized by vocabulary administrator 120, via communication network 108 and network communication links 118. Action 375 may be performed by software code 110, executed by processing hardware 104 of computing platform 102.

Referring to flowchart 370 in further combination with FIG. 2, flowchart 370 also includes configuring, based on word pair characterizations 124, multi-dimensional vector space 201 including embedding vectors each corresponding respectively to one of the second group of words identified in action 372 (action 376). In action 376, multi-dimensional vector space 201 is configured such that each embedding vector corresponding respectively to one of the words included among the second group of words identified in action 372 has the best possible value to ensure distances among all words. It is noted that, in various implementations, the dimension of multi-dimensional vector space 201 can vary and is typically determined empirically by training the system. Moreover, there may not always be an optimal dimension number, and the system is actually robust to working with approximate dimensional size. Nevertheless, in general, a set of dimensional values can be tested ranging from 64 to 1024, increasing by a power of 2 each time.

For example, a set of orthogonal vectors may be initialized, since at the outset of configuration all words are equidistant from one another in the multi-dimensional vector space. Configuration of multi-dimensional vector space 201 continues with optimizing the initially orthogonal vectors using one or more loss functions. By way of example, in some implementations, multi-dimensional vector space 201 may be configured in action 376 using a triplet loss function, a cosine similarity loss function, or both.

When using a triplet loss function, a set of triplets may be created for each word with the following schema: [anchor, positive, negative], where "anchor" is a word from the vocabulary. It is noted that the [anchor, positive, negative] representation is a standardized way to refer to the embeddings used on the triplet loss. In this context, "positive" does not necessarily mean similar, it only means that the anchor/positive pair are closer in the multi-dimensional space than the anchor/negative pair, no assumption is made in this case about the positive/negative pair (it would be valid for them to be close to each other, as long as the relative distances to the anchor are respected). In this set of triplets, there are three distinct types of triplets: 1) [anchor, similar, neither similar nor dissimilar], 2) [anchor, similar, dissimilar], and 3) [anchor, neither similar nor dissimilar, dissimilar]. This triplet loss function enforces that for each triplet the cosine similarity between "word" and "positive" has to be higher than the cosine similarity between "word" and "negative."

A cosine similarity loss function enforces that all "similar" relations among words must have a higher cosine similarity than "neither similar nor dissimilar" and "dissimilar" word relations. Analogously, words that are "neither similar nor dissimilar" are enforced to have a higher cosine similarity than dissimilar words. For example, a random high-dimensional vector may initially be assigned to each word, and then those vectors may be trained using the cosine similarity losses in order for them to have the desired properties. For simplicity, assume that a point in a two-dimensional (2D) plot is assigned to each word. Then that configuration is trained so that the points belonging to similar words are close to one another and the points belonging to dissimilar words are distant from one another. That process results in clusters that enable a determination of how similar two words are just by looking at how far apart are their respective points are. A more realistic example of embedding vectors would appear to be a very long list of random numbers. Unlike the triplet loss function that works with relative relationships among words, the cosine similarity loss function enforces a specific threshold for the distance between words, thereby enabling hard thresholds to be set. The configuration of multi-dimensional vector space 201 based on word pair characterizations 124 may be performed in action 376 by software code 110, executed by processing hardware 104 of computing platform 104.

In some implementations, as noted above by reference to FIG. 1, system memory 106 may store ML model(s) 114. In some of those implementations, processing hardware 104 may execute the software code 110 to train ML model(s) 114 using word pair characterizations 124. Moreover, in those implementations, multi-dimensional vector space 201 may be configured in action 376 using ML model(s) 114 once ML model(s) 114 is/are trained.

Flowchart 370 further includes cross-referencing each word of the second group of words identified in action 372 with its corresponding embedding vector to produce extended vocabulary 113 corresponding to vocabulary 111 received in action 371 (action 377). That is to say, as a result of action 377, in extended vocabulary 113, each word of vocabulary 111 identified in action 372 advantageously is accompanied by, or points to, its corresponding similarity-based embedding vector representation in multi-dimensional vector space 201. It is noted that the information regarding context is coded explicitly in the word itself, so that there will be different embedding vectors when referring to the same word from different contexts. If the embedding vectors only encode words from the same context, no disambiguation is needed, but as long as two or more contexts share multi-dimensional vector space 201, each word may be referred to by using word+context, so that there are unique instances of word+context, and each instance has its own embedding vector. Action 377 may be performed by software code 110, executed by processing hardware 104 of computing platform 102.

Figure 4:
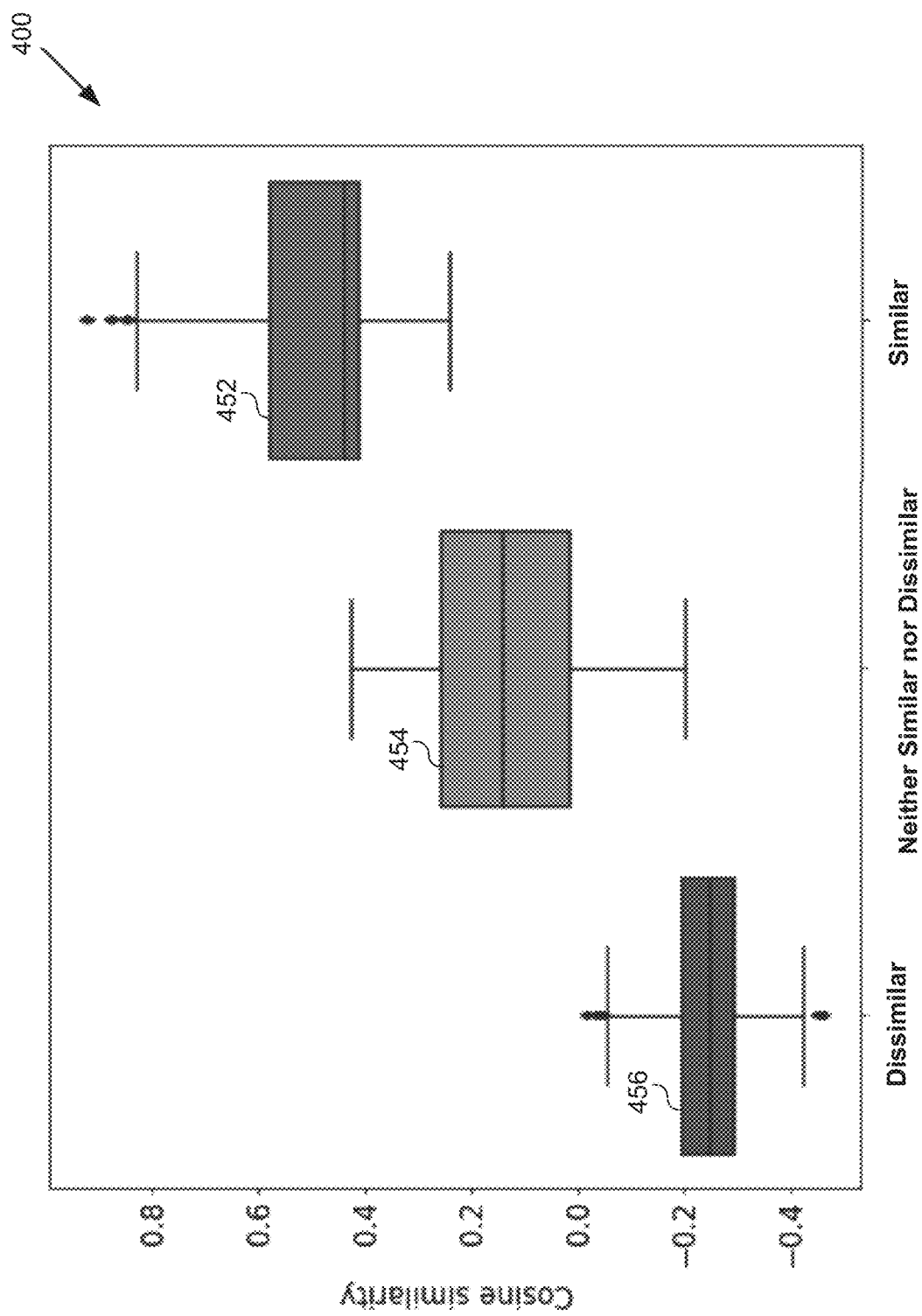
FIG. 4 shows a graph of the respective distributions of similarity-weighted vocabulary words characterized as similar, dissimilar, and neither similar nor dissimilar, according to one implementation.

FIG. 4 shows graph 400 of the respective distributions of similarity-weighted vocabulary words characterized as similar 452, dissimilar 456, and neither similar nor dissimilar 454 based on their cosine similarity distance separations within a multi-dimensional vector space, according to one implementation. As shown in FIG. 4, graph 400 advantageously enables a fine grained comparison among words that are similar, dissimilar, and neither similar nor dissimilar, as well as between similar and dissimilar words, between similar and neither similar nor dissimilar words, and between dissimilar and neither similar nor dissimilar words.

Figure 5:
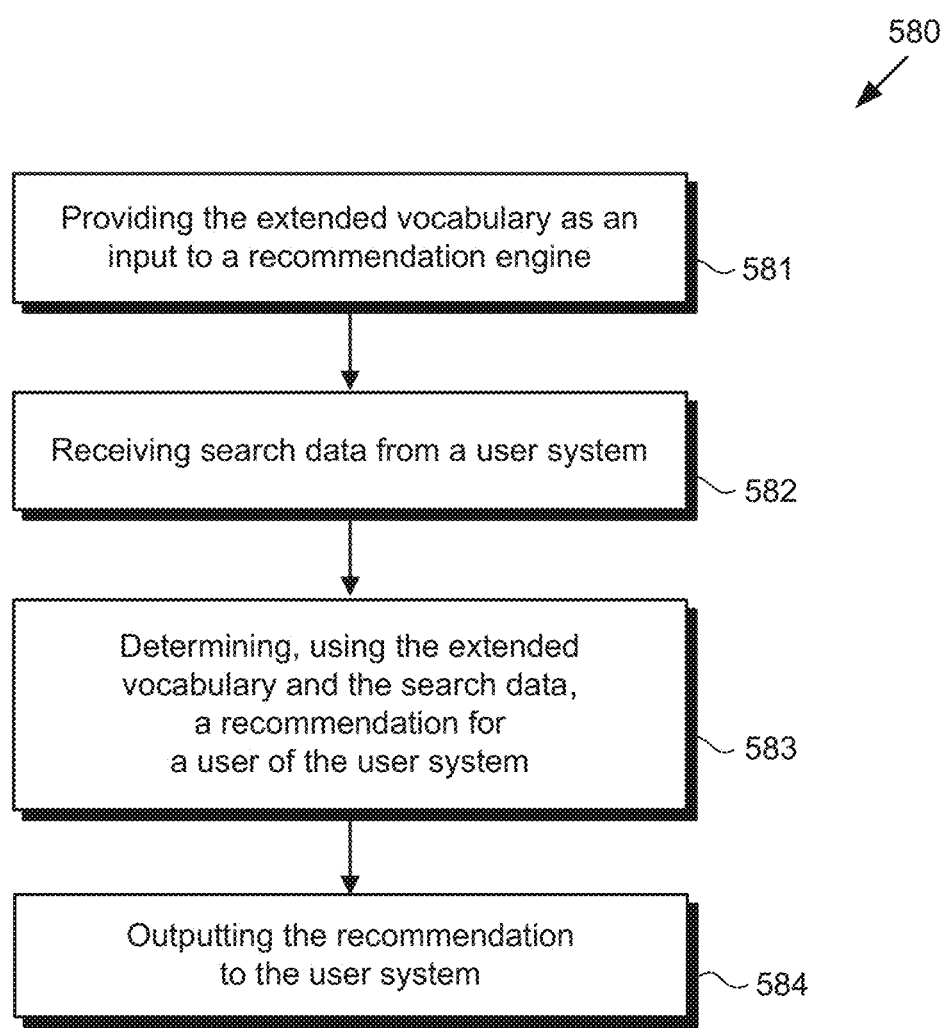
FIG. 5 shows a flowchart describing exemplary actions for extending the method outlined in FIG. 3, according to one implementation.

Referring to FIG. 5, FIG. 5 shows flowchart 580 describing exemplary actions for extending the method outlined in FIG. 3, according to one implementation. With respect to the actions described in FIG. 5, it is noted that certain details and features have been left out of flowchart 580 in order not to obscure the discussion of the inventive features in the present application. Referring to FIG. 1, as noted above, in some implementations, system 100 includes recommendation engine 116. In various implementations, recommendation engine 116 may be configured to recommend one or more of products, services, or content to a user, such as end user 125, based on search data 126 received from end user 125.

In those implementations, processing hardware 104 of computing platform 102 may execute software code 110 to provide extended vocabulary 113 as an input to recommendation engine 116 (action 581). Flowchart 580 further includes receiving search data 126 from user system 156 (action 582). Search data 126 may include data identifying a product, service, or content by content genre or product or service type; content title or product or service description; product brand name; service provider name; a character or actor name; or location, to name a few examples. As shown in FIG. 1, search data 126 may be received by system 100 from user system 156 utilized by end user 125, via communication network 108 and network communication links 118. Action 582 may be performed by recommendation engine 116, executed by processing hardware 104 of computing platform 102.

Flowchart 580 further includes determining, using extended vocabulary 113 and search data 126, recommendation 128 for end user 125 of user system 156 (action 583). The determination of recommendation 128 may include one or more of comparing words included in search data 126 with similar words in extended vocabulary 113, contrasting words included in search data 126 with dissimilar words in extended vocabulary 113, for example. It is noted that the vocabulary 111 may have been used to apply annotations or tags to the content being searched by end user 125. Extended vocabulary 113 can be used to further improve the search results. For example, if end user 125 is searching for "comedy," extended vocabulary 113 reveals that results annotated as "buddy" or other words determined to be similar to "comedy" may also be surfaced, while results annotated as "documentary" or other words determined to be dissimilar to "comedy" should be avoided. Determination of recommendation 128 in action 583 may be performed by recommendation engine 116, executed by processing hardware 104 of computing platform 102.

Flowchart 580 further includes outputting recommendation 128 to user system 156 (action 584). It is noted that in implementations in which search data 126 received in action 582 includes a search for media content, recommendation 128 for end user 125 may identify digital media content that may be streamed or broadcast, such as a movie, TV content, a live sports event, a live news, or a video game, to name a few examples, or physical media in the form of a book or Digital Video Disc (DVD), for instance. As shown in FIG. 1, recommendation 128 may be output to user system 156 utilized by end user 125, by system 100, via communication network 108 and network communication links 118. Action 584 may be performed by recommendation engine 116, executed by processing hardware 104 of computing platform 102.

Thus, the present application discloses systems and methods for providing an extended vocabulary including similarity-weighted vector representations of its words. The solution disclosed in the present application advances the state-of-the-art by effectively embedding information about the similarity relationships among words in a vocabulary in an extended vocabulary including those same words. As a result, in implementations in which the present concepts are applied to the tagging of digital media content, for example, the present solution advantageously enables human and automated taggers alike to accurately apply tags to content in a manner consistent with the intended use of each tag. Moreover, when used in conjunction with a recommendation engine, the present solution can be used to increase the relevance of products, services, or content recommended to an end user based on search data received from the end user, thereby advantageously enhancing the end user's experience.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
    a computing platform including processing hardware and a system memory storing a software code;
    the processing hardware configured to execute the software code to:
        receive a vocabulary including a first plurality of words;
        identify, from among the first plurality of words, a second plurality of words for extending the received vocabulary;
        pair each word of the second plurality of words with every other word included among the second plurality of words to provide a plurality of word pairs;
        output the plurality of word pairs to a human vocabulary administrator;
        receive, from the human vocabulary administrator, a plurality of word pair characterizations each tagged to a respective one of the plurality of word pairs by the human vocabulary administrator, the plurality of word pair characterizations identifying each of the plurality of word pairs as one of similar, dissimilar, or neither similar nor dissimilar;
        configure, based on the plurality of word pair characterizations, a multi-dimensional vector space including a plurality of embedding vectors each corresponding respectively to one of the second plurality of words, wherein all embedding vectors corresponding respectively to words included in a word pair characterized as neither similar nor dissimilar are orthogonal to one another in the multi-dimensional vector space and serve as basis vectors spanning the multi-dimensional vector space; and
        cross-reference each of the second plurality of words with its corresponding embedding vector to produce an extended vocabulary corresponding to the received vocabulary.

2. The system of claim 1, wherein the plurality of embedding vectors provides basis vectors of the multi-dimensional vector space.

3. The system of claim 1, wherein the system memory further stores a machine learning (ML) model, and wherein the processing hardware is further configured to execute the software code to:
train, using the plurality of word pair characterizations, the ML model.

4. The system of claim 3, wherein the multi-dimensional vector space is configured using the trained ML model.

5. The system of claim 1, wherein the multi-dimensional vector space is configured using at least one of a triplet loss function or a cosine similarity loss function.

6. The system of claim 1, wherein the received vocabulary is included in a taxonomy having a hierarchical structure, and wherein the second plurality of words is identified based on a respective position of each word of the second plurality of words within the hierarchical structure.

7. The system of claim 6, wherein the taxonomy comprises a taxonomy of annotation tags configured for application to at least one of products, services, or digital media content.

8. The system of claim 1, further comprising a recommendation engine, wherein the processing hardware is further configured to execute the software code to provide the extended vocabulary as an input to the recommendation engine.

9. The system of claim 8, wherein the processing hardware is further configured to execute the recommendation engine to:
receive search data from a user system;
determine, using the extended vocabulary and the search data, a recommendation for a user of the user system; and
output the recommendation to the user system.

10. The system of claim 9, wherein the recommendation for the user identifies media content in the form of at least one of a movie, television (TV) content, a sports event, news, or a video game.

11. A method for use by a system including a computing platform having processing hardware and a system memory storing a software code, the method comprising:
receiving, by the software code executed by the processing hardware, a vocabulary including a first plurality of words;
identifying, from among the first plurality of words by the software code executed by the processing hardware, a second plurality of words for extending the received vocabulary;
pairing, by the software code executed by the processing hardware, each word of the second plurality of words with every other word included among the second plurality of words to provide a plurality of word pairs;
outputting, by the software code executed by the processing hardware the plurality of word pairs to a human vocabulary administrator;
receiving from the human vocabulary administrator, by the software code executed by the processing hardware, a plurality of word pair characterizations each tagged to a respective one of the plurality of word pairs by the human vocabulary administrator, the plurality of word pair characterizations identifying each of the plurality of word pairs as one of similar, dissimilar, or neither similar nor dissimilar;
configuring, by the software code executed by the processing hardware based on the plurality of word pair characterizations, a multi-dimensional vector space including a plurality of embedding vectors each corresponding respectively to one of the second plurality of words, wherein all embedding vectors corresponding respectively to words included in a word pair characterized as neither similar nor dissimilar are orthogonal to one another in the multi-dimensional vector space and serve as basis vectors spanning the multi-dimensional vector space; and
cross-referencing, by the software code executed by the processing hardware, each of the second plurality of words with its corresponding embedding vector to produce an extended vocabulary corresponding to the received vocabulary.

12. The method of claim 11, wherein the plurality of embedding vectors provides the basis vectors of the multi-dimensional vector space.

13. The method of claim 11, wherein the system memory further stores a machine learning (ML) model, the method further comprising:
training, by the software code executed by the processing hardware and using the plurality of word pair characterizations, the ML model.

14. The method of claim 13, wherein configuring the multi-dimensional vector space is performed using the trained ML model.

15. The method of claim 11, wherein configuring the multi-dimensional vector space is performed using at least one of a triplet loss function or a cosine similarity loss function.

16. The method of claim 11, wherein the received vocabulary is included in a taxonomy having a hierarchical structure, and wherein the second plurality of words is identified based on a respective position of each word of the second plurality of words within the hierarchical structure.

17. The method of claim 16, wherein the taxonomy comprises a taxonomy of annotation tags configured for application to at least one of products, services, or digital media content.

18. The method of claim 11, wherein the system further comprises a recommendation engine, the method further comprising:
providing, by the software code executed by the processing hardware, the extended vocabulary as an input to the recommendation engine.

19. The method of claim 18, further comprising:
receiving, by the recommendation engine executed by the processing hardware, search data from a user system;
determining, by the recommendation engine executed by the processing hardware and using the extended vocabulary and the search data, a recommendation for a user of the user system; and
outputting, by the recommendation engine executed by the processing hardware, the recommendation to the user system.

20. The method of claim 19, wherein the recommendation for the user identifies media content in the form of at least one of a movie, television (TV) content, a sports event, news, or a video game.

* * * * *